United States Patent

Polenick et al.

[11] Patent Number: 6,158,207
[45] Date of Patent: Dec. 12, 2000

[54] MULTIPLE GAS TURBINE ENGINES TO NORMALIZE MAINTENANCE INTERVALS

[75] Inventors: Michael J. Polenick, Phoenix; Michael W. Scott, Chandler, both of Ariz.

[73] Assignee: AlliedSignal Inc., Morristownship, N.J.

[21] Appl. No.: 09/257,388

[22] Filed: Feb. 25, 1999

[51] Int. Cl.[7] ................................................... F02C 6/00
[52] U.S. Cl. ........................................ 60/39.02; 60/39.13
[58] Field of Search ............................. 60/39.02, 39.13, 60/39.141

[56] References Cited

U.S. PATENT DOCUMENTS 5,737,911  4/1998  Hoizumi et al. ..................... 60/39.02

*Primary Examiner*—Timothy S. Thorpe
*Assistant Examiner*—Ehud Gartenberg
*Attorney, Agent, or Firm*—Robert Desmond, Esq.

[57] ABSTRACT

The present invention providing a control and method having for starting and stopping gas turbine engines in a set of such engines controlled from a master controller. Incorporated in the master controller is a predetermined optimum life schedule selected to make maintenance intervals predictable. The actual age of each engine is compared to its optimum age as determined by the schedule. When power demand increases, the master controller will always start the engine whose actual age is the farthest below its optimum age and when power demand decreases, the master controller will always stop the engine whose actual age is the farthest above its optimum age. Thus, over the life of the site, the aging of the engines will converge on the predetermined optimum life schedule making maintenance intervals predictable.

17 Claims, 6 Drawing Sheets

MULTIPLE GAS TURBINE ENGINES TO NORMALIZE MAINTENANCE INTERVALS

TECHNICAL FIELD

This invention relates generally to gas turbine engine controls, and in particular to a control and method for operating a set of multiple engines that normalizes the period between overhauls for the engines in the set.

BACKGROUND OF THE INVENTION

FIG. 1 shows a typical arrangement where multiple gas turbine engines or skids, numbered 1–5, are operated at a single site. The operation of each engine is controlled by its electronic control unit 6, which in turn receives commands from a master controller 7. The master controller 7 governs the operation of the entire site and for example will control a compressor 8 which receives fuel from a tank 9 and flows the pressurized fuel to each of the engines 1–5. In response to a variety of inputs, the master controller starts and stops the five engines as needed.

Maintenance costs associated with gas turbine engines are a major concern of operators of such engines. Great efforts are taken to predict what the costs will be and to reduce these costs as much as possible by performing routine maintenance at periodic intervals. Where multiple engines are located at a single site, predictable maintenance is important for logistical reasons as well issues such as plant availability and spare parts availability. Generally, these engines will age together and reach predetermined maintenance intervals at the same time. As result, the operator may have to absorb large maintenance costs within a short period of time and could also lose plant availability if all the engines need service at the same time.

For example, assume the engines 1–5 have a recommended time between overhauls of 30,000 hours and the annual average load at the site is 25,000 hours per year, (5000 hours per engine per year). If the engines are started by the youngest age when load demand increases, then all engines will age at the same rate and reach the 30,000-hour limit within a few months of each other. In this scenario, the owner would have to pay for several overhauls in one year and possibly lose plant availability during the time all five engines are being overhauled.

Unless all five engines are needed all the time, the master controller can be programmed to select which engines to start as power demand increases, and which to stop when power demand decreases. Accordingly, there is a need for a method of selecting which engines to start and stop so that the engines reach their maintenance interval in a nonrandom manner thus making maintenance costs predictable and minimizing the downtime for the site.

SUMMARY OF THE INVENTION

An object of the present invention is to provide a method for selecting which engines, of a set of engines, to start and stop so that the life of the engines is normalized to a predetermined optimum life schedule that is selected to maker maintenance intervals predictable.

The present invention achieves this object by providing a control and method having incorporated therein a predetermined optimum life schedule selected to make maintenance intervals predictable. To implement this schedule, each engine of the set is assigned a first parameter based on the order that it will require an overhaul. The actual age of each engine is calculated and then these ages are summed. This sum is then normalized to define a second parameter. The two parameters are multiplied to arrive at an optimum age for each engine. Each engine's actual age is subtracted from its optimum age to define a third parameter. Based on this third parameter, when power demand increases the master controller will always start the engine whose actual age is the farthest below its optimum age. Likewise, again based on this third parameter, when power demand decreases, the master controller will only select the engine whose actual age is the farthest above its optimum age to stop. Thus, over the life of the site, the aging of the engines will converge on the predetermined optimum life schedule making maintenance intervals predictable.

These and other objects, features and advantages of the present invention, are specifically set forth in, or will become apparent from, the following detailed description of a preferred embodiment of the invention when read in conjunction with the accompanying drawings.

DESCRIPTION OF THE PREFERRED EMBODIMENT

Figure 1:
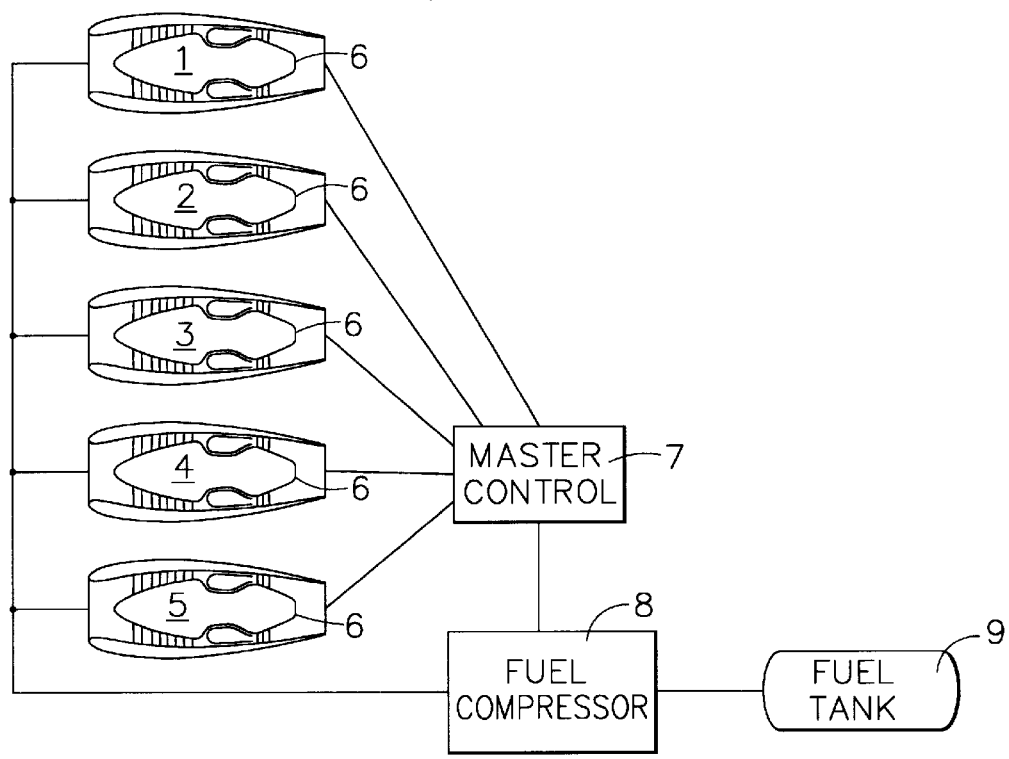
FIG. 1 is a schematic of typical arrangement where a set of gas turbine engines operates at a single site.

The following description of the preferred embodiment is made in reference to the set of engines shown in FIG. 1. It would be appreciated to one skilled in the art, that the present invention could be used with any group of multiple engines, regardless of the number of engines in the set. Referring to FIG. 1, the master controller 7 selects which of the engines 1–5 are to be started or stopped. This selection is preferably implemented by a microprocessor programmed to perform the functions set forth in FIGS. 2–8. These functions can be programmed by anyone skilled in the programming art. Alternatively, the functions can be implemented by analog or digital circuitry.

Figure 2:
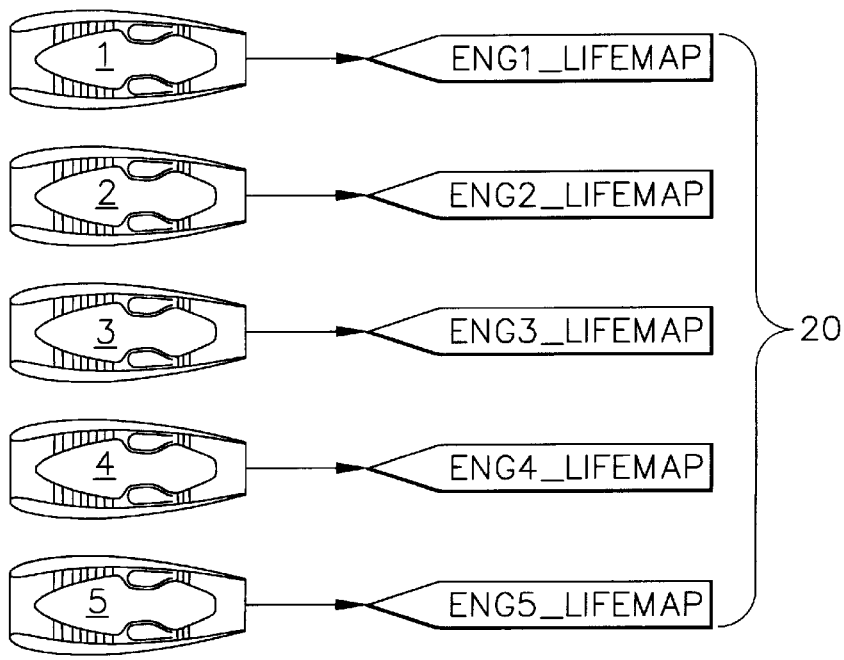
FIGS. 2–8 are flow charts illustrating the steps of the method contemplated by the present invention.

Referring to FIG. 2, each of the engines 1–5 is given a lifemap designation 20 (ENG#_LIFEMAP) which determines the order in which the engines will be overhauled. For example, the engine with the designation 5 is selected to be the first to be overhauled and the engine with designation 1 the last. The first time this function is implemented, the designation of the engines is at the discretion of the user. However, once an engine has been overhauled and then returned to operation, that engine will be given the designation of 1, and the other engines redesignated depending on how close they are to being overhauled.

Figure 3:
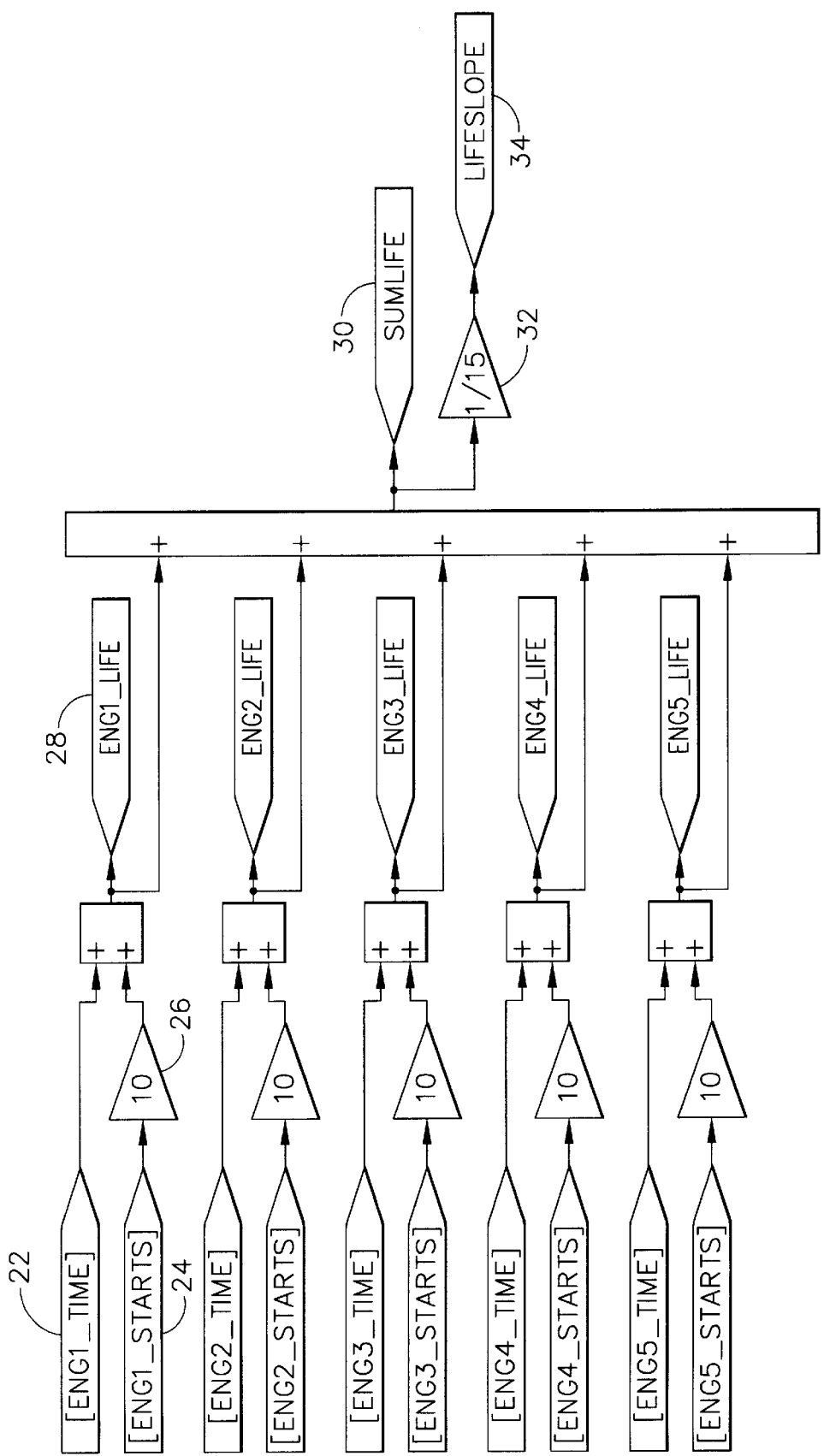
Figure 9:
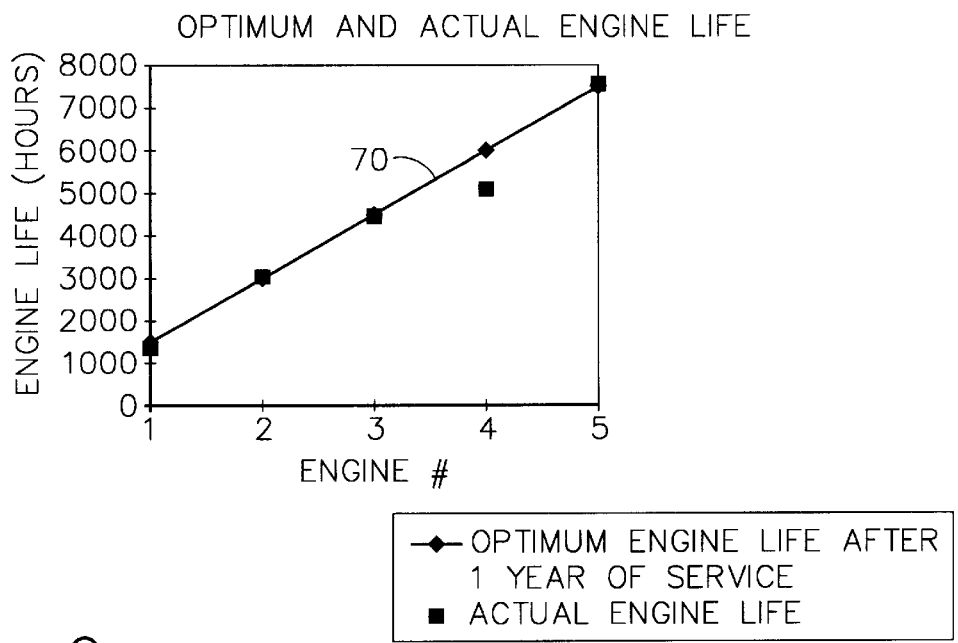
FIG. 9 is a graph showing optimum engine life and actual engine life.
Figure 10:
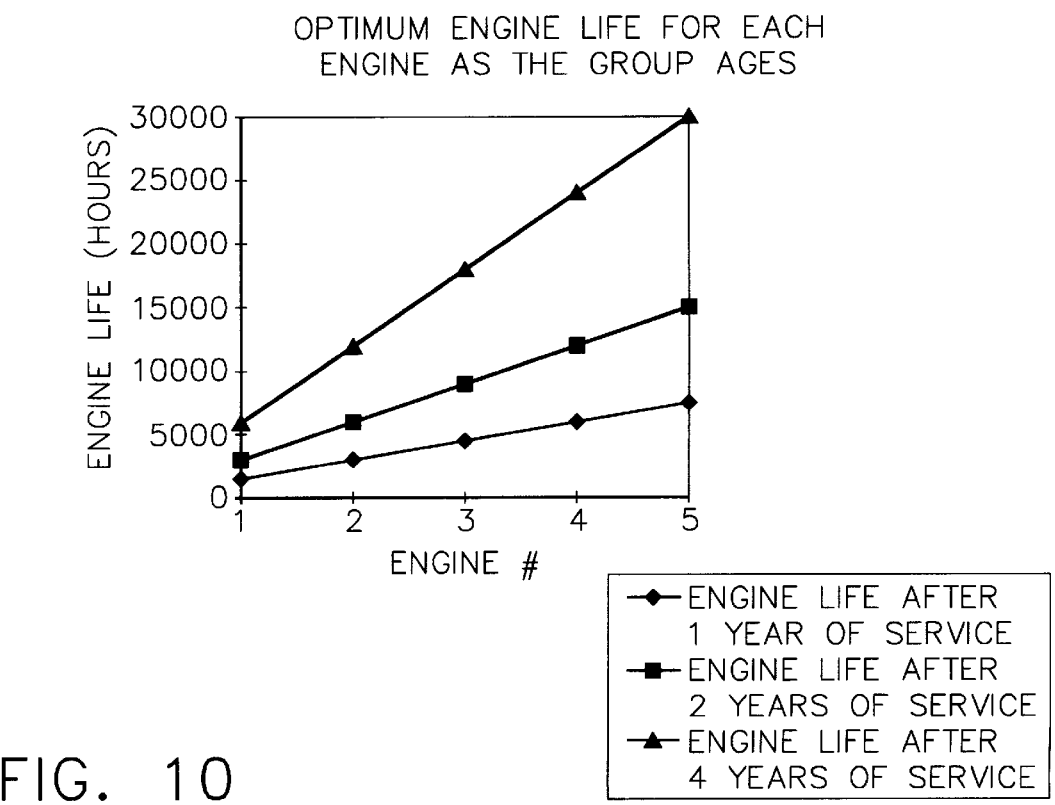
FIG. 10 is a graph showing optimum engine life for each engine as the group ages.

Referring to FIG. 3, the master controller 7 receives from each electronic control unit 6 a signal 22 (ENG#_Time), indicative of the number of hours the respective engines as operated since entering service either initially or after an overhaul. The controller 7 also receives from the electronic control units 6 a signal 24 (ENG#_STARTS) indicative of the number of starts the respective engine has performed, again since entering service initially or after an overhaul. The signal 24 is multiplied by a first factor 26 and then added to signal 22 to generate a signal 28 (ENG#_LIFE) indicative of the actual life of each of the engines 1–5. These signals 28 are then summed to generate a signal 30 (SUM_LIFE). The signal 30 is multiplied by a normalization factor 32 to generate a LIFESLOPE parameter 34. In the preferred embodiment, the first factor 26 is equal to 10 because the inventors have discovered that generally one engine start is equivalent to 10 hour of operation in terms of the impact on the life of the engine. The term "life of the engine" means the time between overhauls. It will be appreciated by those skilled in the art, that the value for factor 26 will vary depending on numerous factors such as the type of engine or site operating conditions. The normalization factor 32 is derived from the predetermined optimum life schedule. In the preferred embodiment, this predetermined schedule is a linear line 70 as shown in FIGS. 9 and 10 and the normalization factor 32 is calculated by taking the reciprocal of the sum of the number of engines that have been given a lifemap designation 20. In the preferred embodiment this number is five, so factor 32 equals 1/(5+4+3+2+1). Again, this value will vary depending on the number of engines in the set and the shape of the optimum life schedule.

Figure 4:
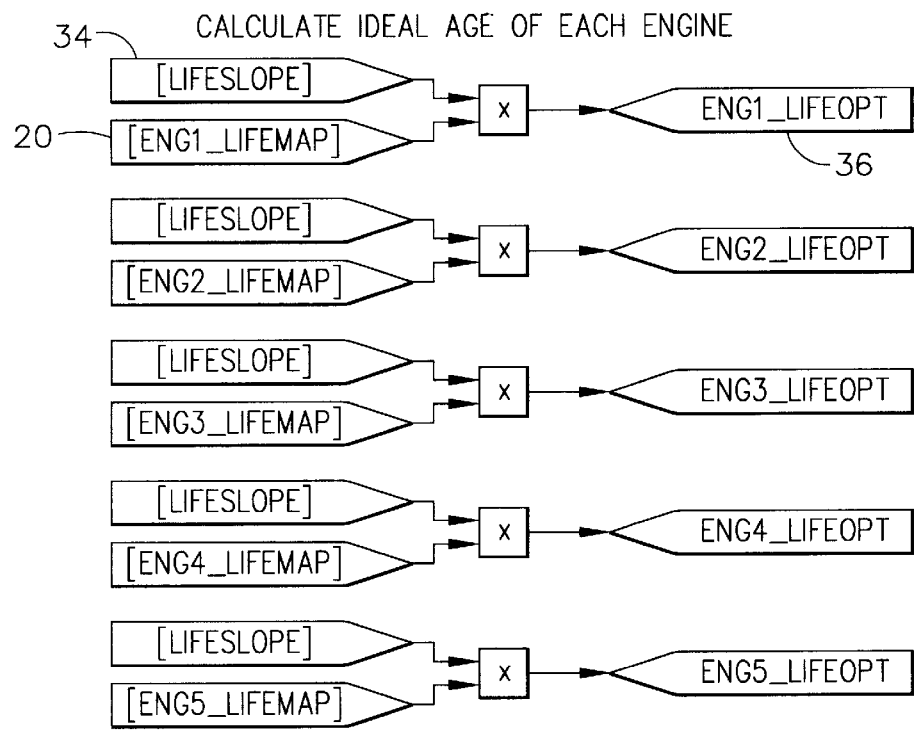
Figure 5:
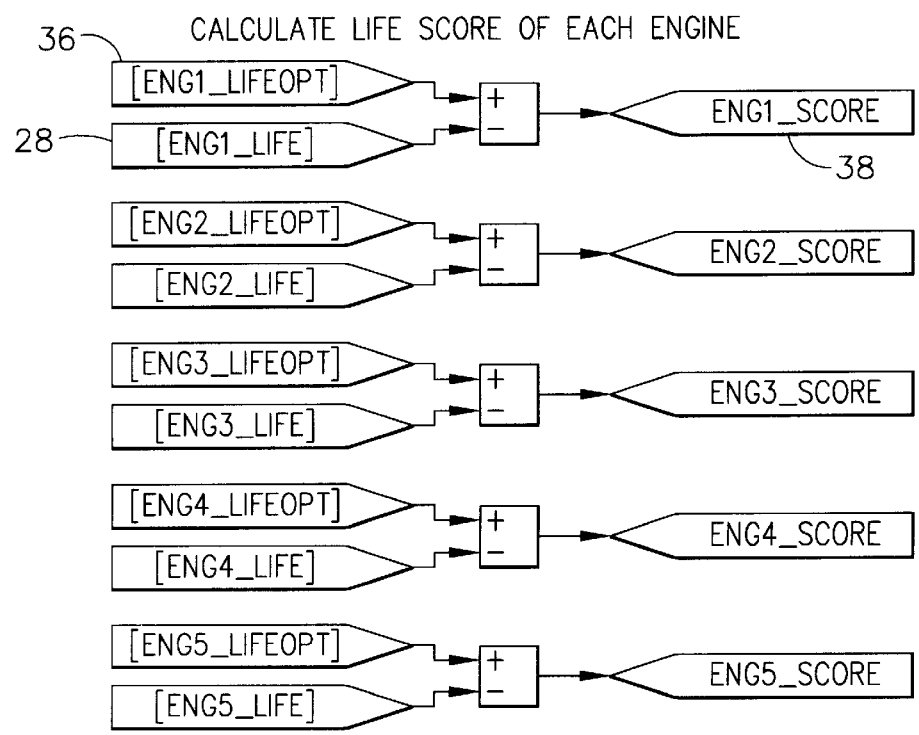
Figure 6:
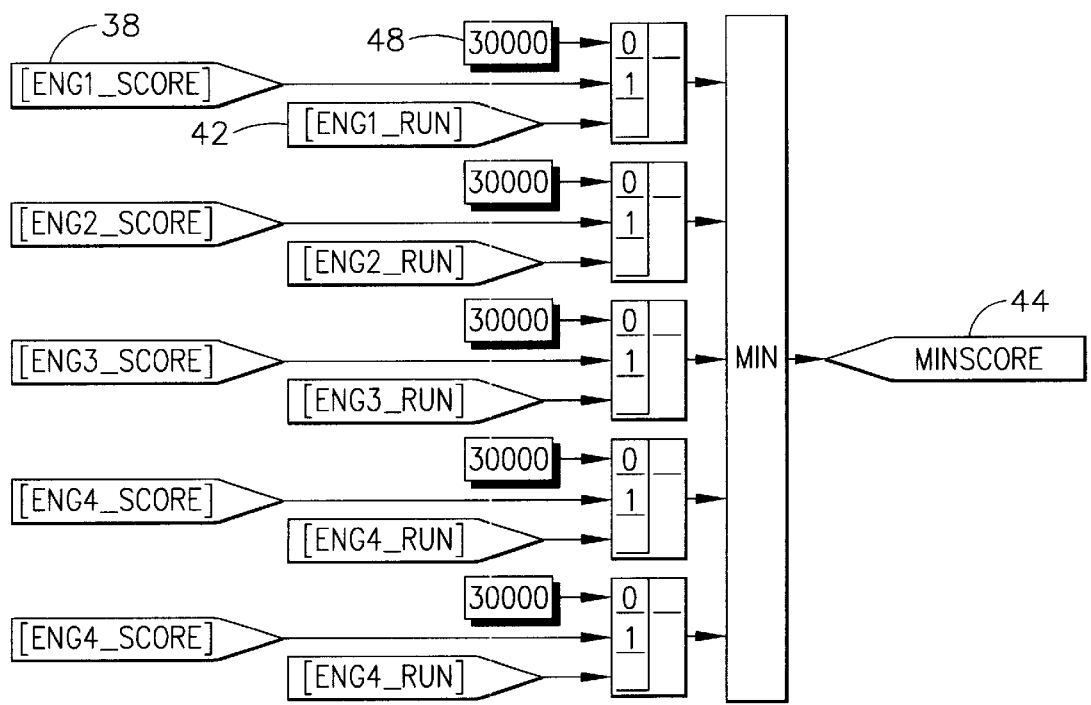
Figure 7:
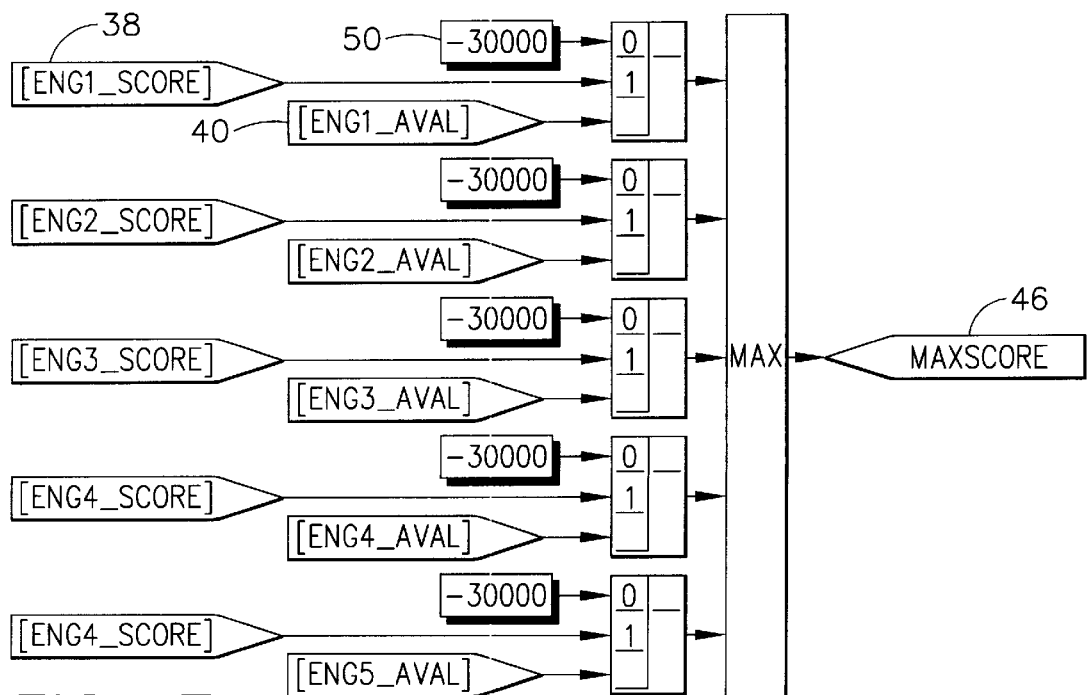

As shown in FIGS. 4 and 5, the ENG#_LIFEMAP 20 for each of the engines 1–5 is multiplied by the LIFESLOPE 34 to calculate an optimum age 36 (ENG#_LIFEOPT). The optimum age is the age of the engine as determined by the predetermined optimum life schedule. The ENG#_LIFE 28 for each engine is then subtracted from the respective engine's optimum age 36 to generate an engine score (ENG#_SCORE) 38. The master controller 7 also receives from each of the electronic control units 6 an engine available signal 40 (ENG#_AVAL) which means that the particular engine is available to be started, or an engine run signal 42 (ENG#RUN) which means that a particular engine is running. Using these signals 40,42 a MINSCORE 44 and a MAXSCORE 46 are calculated. Referring to FIG. 6, for each of the engines 1–5 that are running, their respective ENG#_SCORE 38 are compared and the minimum selected as the MINSCORE. 44. If an engine is not running, its ENG#_SCORE 38 is ignored and instead a preselected minimum life score 48 is used. As will become clear later in the specification, this is done to avoid trying to stop an engine that is not running. In the preferred embodiment, the score 48 is set at 30,000 hours which is recommended time between overhauls for the embodiment shown in FIG. 1. Clearly, this value will change from application to application. Referring to FIG. 7, for each of the engines 1–5 that are available to be started, their respective ENG#_SCOREs 38 are compared and the maximum selected as the MAXSCORE. 46. If an engine is not available, its ENG#_SCORE 38 is ignored and instead a preselected maximum life score 50 is used. This is done to avoid trying to start an engine that is already running, or is otherwise not available to be used. In the preferred embodiment, the score 50 is set at −30,000 hours which is the negative of the score 48.

Figure 8:
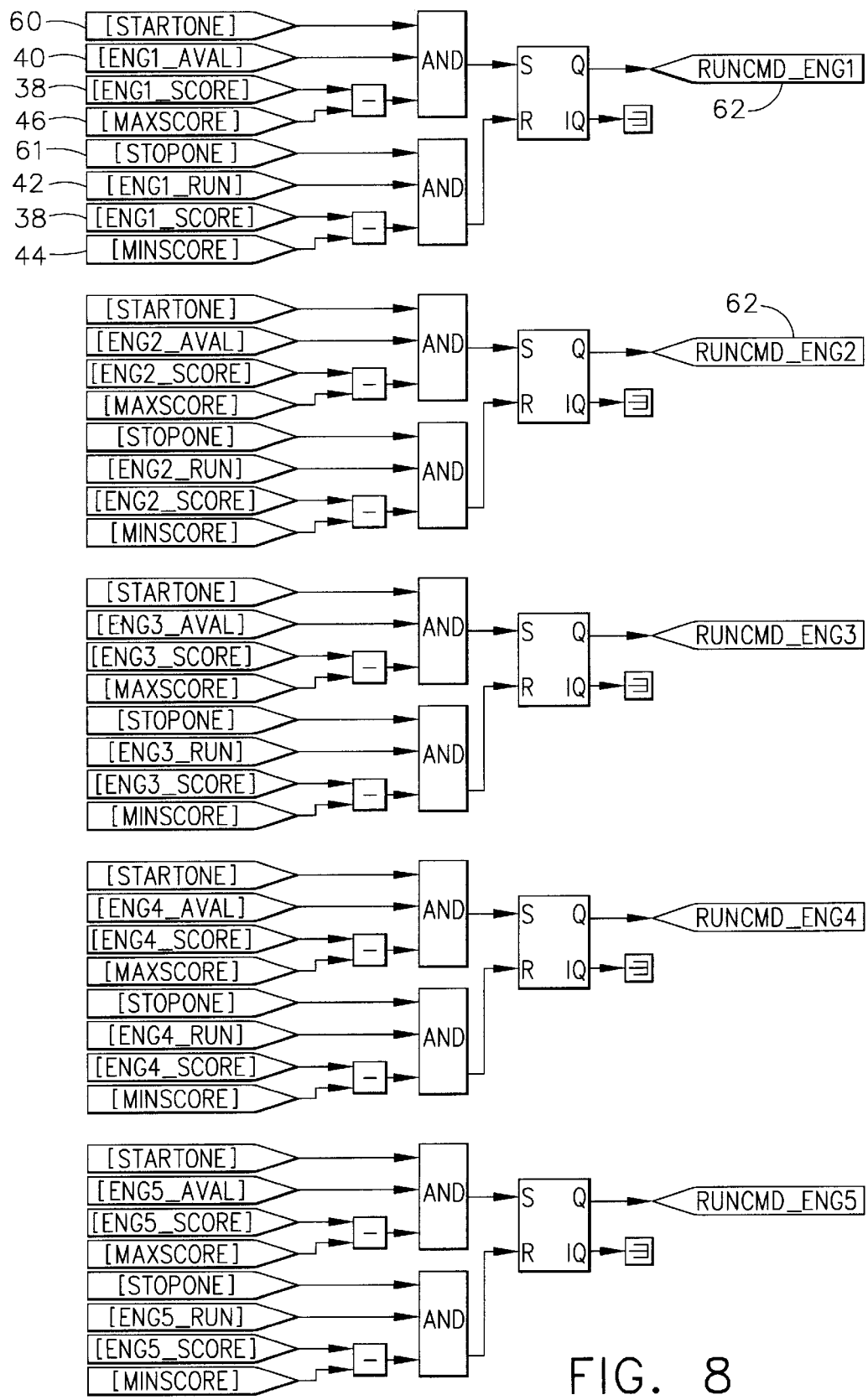

Referring to FIG. 8, if there is a need to start one of the engines 1–5, the master controller 7 receives a start signal 60 (STARTONE). The controller then determines which engines 1–5 have an engine available signal 40 and selects from these engines that engine having an engine score 38 equal to the maximum score 46. Only one of the engines 1–5 will meet the criteria and the master controller 7 sends a command signal 62 commanding that engine to start. If another engine is needed the process is repeated until all engines are operating. The result is that the nonrunning engine with an actual life the farthest below the optimum life schedule for the set of engines is always the first to be started. This is illustrated in FIG. 9, where after one year of service the actual life for each of the engines 1,2,3 and 5 are on the optimum engine life schedule 70 for the set. The actual life of engine 4 is below the optimum. With the control system as contemplated by the present invention, the next time an engine is needed, engine 4 will be selected as the engine to be started.

Similarly, if there is a need to stop one of the engines 1–5, the master controller 7 receives a stop signal 61 (STOPONE). The controller than determines which engines 1–5 have an engine run signal 42 and selects from these engines that engine having an engine score 38 equal to the minimum score 44. Again, only one of the engines 1–5 will meet the criteria and the master controller 7 sends a command signal 62 commanding that engine to stop or shutdown. If another engine is needed the process is repeated until all engines are stopped. The result is that the running engine with the highest actual life above the optimum life schedule 70 is always the first to be stopped.

The present invention selects which engines to start and stop so that the actual life of the engines converges on a predetermined optimum life schedule as the group ages. This is illustrated in FIG. 10, which shows that the linearity of the aging of the engines is maintained year after year, so that by the fourth year only engine 5 has reached the maintenance interval of 30,000 hours and is now ready to be removed from the grid. Importantly, the other engines still have sufficient of life left so that the ability to operate the site is not impacted. Thus, the actual age of the engines is managed, making maintenance intervals more predictable.

Various modifications and alterations to the above-described preferred embodiment will be apparent to those skilled in the art. For example, instead of the linear optimum life schedule, the life schedule could have a variety of different shapes or could selected for reasons other that to make maintenance intervals more predictable. Accordingly, these descriptions of the invention should be considered exemplary and not as limiting the scope and spirit of the invention as set forth in the following claims.

What is claimed is:

1. A method for selecting which engines of a power generation plant to start and stop where there are a plurality of engines controlled by a master controller, comprising the steps of:

assigning to each engine a first parameter in the order that said engines will require an overhaul;

calculating an actual age for each of said engines;

summing said actual ages;

generating a second parameter by multiplying said sum by a first normalization factor;

calculating an optimum age for each of said engines by multiplying each engine's first parameter by said second parameter;

calculating a third parameter for each of said engines by subtracting each engine's actual age from its optimum age; and selecting which of said engines to start and stop based on their respective third parameter.

2. The method of claim 1 wherein said step of calculating an actual ages includes the step of receiving a first signal indicative of the time the engine has operated.

3. The method of claim 2 further includes the steps of receiving a second signal indicative of the number of starts the engine has experienced and summing said first signal with said second signal.

4. The method of claim 3 further including the step of adjusting one of said first and second signal by a second normalization factor before the step of summing said first and second signals.

5. The method of claim 1 further including the step of calculating said first normalization factor.

6. The method of claim 5 wherein said step of calculating said first normalization factor comprises the step of taking the reciprocal of the sum of the number of engines in said plurality of engines.

7. The method of claim 1 wherein said selecting step comprises the step of determining a minimum value for said third parameter.

8. The method of claim 7 wherein said step of determining a minimum value comprises the step of comparing said third factors for each engine that is running and selecting the least of these for said minimum value.

9. The method of claim 8 wherein said step of determining a minimum value further comprises the step of comparing said selected minimum value with a predetermined minimum value and selecting the least of these for said minimum value.

10. The method of claim 7 wherein said selecting step further comprises the steps of:

receiving a signal to stop one of said engines;

receiving a signal indicative of which of said engines is running;

comparing said third parameter for each of the available engines with said minimum value;

selecting that available engine whose third parameter is equal to said minimum values; and sending a stop command signal to said selected engine.

11. The method of claim 1 wherein said selecting step comprises the step of determining a maximum value for said third parameter.

12. The method of claim 11 wherein said step of determining a maximum value comprises the step of comparing said third factors for each engine that is available and selecting the greatest of these for said maximum value.

13. The method of claim 12 wherein said step of determining a maximum value further comprises the step of comparing said selected maximum value with a predetermined maximum value and selecting the greatest of these for said maximum value.

14. The method of claim 11 wherein said selecting step further comprises the steps of:

receiving a signal to start one of said engines;

receiving a signal indicative of which of said engines is available to start;

comparing said third parameter for each of the running engines with said maximum value;

selecting the running engine whose third parameter is equal to said maximum value; and sending a start command signal to said selected engine.

15. A method for selecting which engines to start and stop where there is a set of engines operated from a master controller comprising the steps of:

selecting an optimum life schedule for said set;

programming said schedule in said master controller;

determining the actual life of each of the engines in the set; and starting and stopping engines so that the actual life of said engines converges on the optimum life schedule.

16. The method of claim 15 wherein said optimum life schedule is a linear line.

17. The method of claim 15 wherein said optimum life schedule is selected to make maintenance intervals of said engines predictable.

* * * * *